United States Patent
Dave et al.

(10) Patent No.: US 9,984,427 B2
(45) Date of Patent: May 29, 2018

(54) DATA INGESTION MODULE FOR EVENT DETECTION AND INCREASED SITUATIONAL AWARENESS

(71) Applicant: QBASE, LLC, Reston, VA (US)

(72) Inventors: Rakesh Dave, Dayton, OH (US); Sanjay Boddhu, Dayton, OH (US)

(73) Assignee: QBase, LLC, Reston, VA (US)

( * ) Notice: Subject to any disclaimer, the term of this patent is extended or adjusted under 35 U.S.C. 154(b) by 0 days. days.

(21) Appl. No.: 14/557,781

(22) Filed: Dec. 2, 2014

(65) Prior Publication Data
US 2015/0154249 A1    Jun. 4, 2015

Related U.S. Application Data

(60) Provisional application No. 61/910,825, filed on Dec. 2, 2013.

(51) Int. Cl.
*G06F 17/30* (2006.01)
*G06Q 50/10* (2012.01)

(52) U.S. Cl.
CPC ....... *G06Q 50/10* (2013.01); *G06F 17/30864* (2013.01)

(58) Field of Classification Search
CPC .......................... G06F 17/30864; G06Q 50/10
See application file for complete search history.

(56) References Cited

U.S. PATENT DOCUMENTS

| | | | |
|---|---|---|---|
| 6,128,660 A | 10/2000 | Grimm et al. | |
| 6,178,529 B1 | 1/2001 | Short et al. | |
| 6,266,781 B1 | 7/2001 | Chung et al. | |
| 6,353,926 B1 | 3/2002 | Parthesarathy et al. | |
| 6,738,759 B1 | 5/2004 | Wheeler et al. | |
| 6,832,737 B2 | 12/2004 | O'Neill | |
| 7,058,846 B1 | 6/2006 | Kelkar et al. | |
| 7,370,323 B2 | 5/2008 | Marinelli et al. | |
| 7,421,478 B1 | 9/2008 | Muchow | |

(Continued)

FOREIGN PATENT DOCUMENTS

WO    2013/003770 A2    1/2013

OTHER PUBLICATIONS

International Search Report and Written Opinion dated Mar. 3, 2015 corresponding to International Patent Application No. PCT/US2014/067921, 10 pages.

(Continued)

*Primary Examiner* — Amresh Singh
(74) *Attorney, Agent, or Firm* — Eric L. Sophir; Dentons US LLP

(57) ABSTRACT

A system and method for detecting and summarizing events based on data feeds from a plurality of sources. Such sources may include social media networks, text messages, news feeds among others. The system may receive raw information from such sources containing data related with possible events. Method for event detection may include pre-processing and normalizing data input from any source registered, this may also include; extracting and disambiguating events and entities, associate event and entities, correlate events and entities associated from a data input which results from a different data source, for validating/verifying an event. Subsequently, the validated/verified event may be stored in a local data storage and/or in a web-server.

10 Claims, 4 Drawing Sheets

(56) References Cited

U.S. PATENT DOCUMENTS

| | | | |
|---|---|---|---|
| 7,447,940 B2 | 11/2008 | Peddada | |
| 7,543,174 B1 | 6/2009 | van Rietschote et al. | |
| 7,681,075 B2 | 3/2010 | Havemose et al. | |
| 7,818,615 B2 | 10/2010 | Krajewski et al. | |
| 7,899,871 B1* | 3/2011 | Kumar et al. | 709/206 |
| 8,055,933 B2 | 11/2011 | Jaehde et al. | |
| 8,122,026 B1 | 2/2012 | Laroco et al. | |
| 8,341,622 B1 | 12/2012 | Eatough | |
| 8,345,998 B2 | 1/2013 | Malik et al. | |
| 8,356,036 B2 | 1/2013 | Betchel et al. | |
| 8,375,073 B1 | 2/2013 | Jain | |
| 8,423,522 B2 | 4/2013 | Lang et al. | |
| 8,429,256 B2 | 4/2013 | Vidal et al. | |
| 8,726,267 B2 | 5/2014 | Li et al. | |
| 8,782,018 B2 | 7/2014 | Shim et al. | |
| 8,995,717 B2 | 3/2015 | Cheng et al. | |
| 9,009,153 B2 | 4/2015 | Kahn et al. | |
| 9,025,892 B1 | 5/2015 | Lightner et al. | |
| 9,032,387 B1 | 5/2015 | Hill et al. | |
| 9,177,254 B2 | 11/2015 | Boddhu et al. | |
| 2001/0037398 A1 | 11/2001 | Chao et al. | |
| 2002/0165847 A1 | 11/2002 | McCartney et al. | |
| 2002/0174138 A1 | 11/2002 | Nakamura et al. | |
| 2003/0028869 A1 | 2/2003 | Drake et al. | |
| 2003/0112792 A1 | 6/2003 | Cranor et al. | |
| 2003/0158839 A1 | 8/2003 | Faybishenko et al. | |
| 2003/0182282 A1 | 9/2003 | Ripley | |
| 2004/0027349 A1 | 2/2004 | Landau et al. | |
| 2004/0143571 A1 | 7/2004 | Bjornson et al. | |
| 2004/0153869 A1 | 8/2004 | Marinelli et al. | |
| 2004/0205064 A1 | 10/2004 | Zhou et al. | |
| 2004/0215755 A1 | 10/2004 | O'Neill | |
| 2005/0192994 A1 | 9/2005 | Caldwell et al. | |
| 2006/0101081 A1 | 5/2006 | Lin et al. | |
| 2006/0294071 A1 | 12/2006 | Weare et al. | |
| 2007/0005639 A1 | 1/2007 | Gaussier et al. | |
| 2007/0203693 A1 | 8/2007 | Estes | |
| 2007/0203924 A1 | 8/2007 | Guha et al. | |
| 2007/0240152 A1 | 10/2007 | Li et al. | |
| 2007/0250519 A1 | 10/2007 | Fineberg et al. | |
| 2007/0282959 A1 | 12/2007 | Stern | |
| 2008/0010683 A1* | 1/2008 | Baddour et al. | 726/24 |
| 2008/0027920 A1 | 1/2008 | Schipunov et al. | |
| 2009/0019013 A1 | 1/2009 | Tareen et al. | |
| 2009/0043792 A1 | 2/2009 | Barsness et al. | |
| 2009/0049038 A1 | 2/2009 | Gross | |
| 2009/0089626 A1 | 4/2009 | Gotch et al. | |
| 2009/0094484 A1 | 4/2009 | Son et al. | |
| 2009/0240682 A1 | 9/2009 | Balmin et al. | |
| 2009/0292660 A1 | 11/2009 | Behal et al. | |
| 2009/0299999 A1 | 12/2009 | Loui et al. | |
| 2009/0322756 A1 | 12/2009 | Robertson et al. | |
| 2010/0077001 A1 | 3/2010 | Vogel et al. | |
| 2010/0138931 A1 | 6/2010 | Thorley et al. | |
| 2010/0223264 A1 | 9/2010 | Brucker et al. | |
| 2010/0235311 A1 | 9/2010 | Cao et al. | |
| 2010/0274785 A1 | 10/2010 | Procopiuc et al. | |
| 2011/0040760 A1* | 2/2011 | Fleischman et al. | 707/737 |
| 2011/0044447 A1* | 2/2011 | Morris | G06T 11/206 379/265.03 |
| 2011/0071975 A1 | 3/2011 | Friedlander et al. | |
| 2011/0093471 A1 | 4/2011 | Brockway et al. | |
| 2011/0119243 A1 | 5/2011 | Diamond et al. | |
| 2011/0125764 A1 | 5/2011 | Carmel et al. | |
| 2011/0296397 A1 | 12/2011 | Vidal et al. | |
| 2012/0030220 A1 | 2/2012 | Edwards et al. | |
| 2012/0059839 A1 | 3/2012 | Andrade et al. | |
| 2012/0102121 A1 | 4/2012 | Wu et al. | |
| 2012/0117069 A1 | 5/2012 | Kawanishi et al. | |
| 2012/0131139 A1* | 5/2012 | Siripurapu et al. | 709/217 |
| 2012/0246154 A1 | 9/2012 | Duan et al. | |
| 2012/0310934 A1 | 12/2012 | Peh et al. | |
| 2012/0323839 A1 | 12/2012 | Kiciman et al. | |
| 2013/0132405 A1 | 5/2013 | Bestgen et al. | |
| 2013/0166480 A1 | 6/2013 | Popescu et al. | |
| 2013/0166547 A1 | 6/2013 | Pasumarthi et al. | |
| 2013/0290232 A1 | 10/2013 | Tsytsarau et al. | |
| 2013/0303198 A1 | 11/2013 | Sadasivam et al. | |
| 2014/0013233 A1 | 1/2014 | Ahlberg et al. | |
| 2014/0022100 A1 | 1/2014 | Fallon et al. | |
| 2014/0156634 A1 | 6/2014 | Buchmann et al. | |
| 2014/0244550 A1 | 8/2014 | Jin et al. | |
| 2014/0351233 A1 | 11/2014 | Crupi et al. | |
| 2015/0066904 A1* | 3/2015 | Asur | G06F 17/30864 707/722 |
| 2015/0074037 A1 | 3/2015 | Sarferaz | |
| 2015/0154079 A1 | 6/2015 | Lightner et al. | |
| 2015/0154264 A1 | 6/2015 | Lightner et al. | |
| 2015/0154297 A1 | 6/2015 | Lightner et al. | |

OTHER PUBLICATIONS

International Search Report and Written Opinion dated Mar. 10, 2015 corresponding to International Patent Application No. PCT/US2014/067999, 10 pages.

International Search Report and Written Opinion of the International Searching Authority dated Apr. 15, 2015 corresponding to International Patent Application No. PCT/US2014/068002, 10 pages.

International Search Report and Written Opinion dated Feb. 24, 2015 corresponding to International Patent Application No. PCT/US2014/067918, 10 pages.

International Search Report and Written Opinion dated Mar. 6, 2015 corresponding to International Patent Application No. PCT/US2014/067993, 9 pages.

Tunkelang, D., "Faceted Search," Morgan & Claypool Publ., 2009, pp. i-79.

Schuth, A., et al., "University of Amsterdam Data Centric Ad Hoc and Faceted Search Runs," ISLA, 2012, pp. 155-160.

Tools, Search Query Suggestions using ElasticSearch via Shingle Filter and Facets, Nov. 2012, pp. 1-12.

* cited by examiner

DATA INGESTION MODULE FOR EVENT DETECTION AND INCREASED SITUATIONAL AWARENESS

CROSS-REFERENCE TO RELATED APPLICATIONS

This non-provisional patent application is related to U.S. Provisional Patent Application Ser. No. 61/910,825, entitled "Data Ingestion Module For Event Detection And Increased Situational Awareness," filed Dec. 2, 2013, which is incorporated herein by reference in its entirety.

This application is related U.S. patent application Ser. No. 14/558,300, entitled "Event Detection Through Text Analysis Using Trained Event Template Models," filed Dec. 2, 2014, which is hereby incorporated by reference in its entirety.

TECHNICAL FIELD

The present disclosure relates in general to information data mining from social media sources, and more specifically to event detection, extraction and validation from media sources.

BACKGROUND

The internet provides several sources of information which may be exploited. Internet news feeds and websites that allow users to interact with one another have exploded in popularity in the last few years. news feed channels such as CNN®, social networking websites sites such as Facebook® or LinkedIn®, and microblogging websites such as Twitter® enjoy widespread use. Millions of users post messages, images and videos on such websites on a daily, even hourly basis. Often, information gathered from these sources may refer to events taking place in real time. Such publicly accessible media may serve as a rich mine of information that may be used in different applications. Such information may be extracted in order to obtain an increased situational awareness about any event, such as, fire, earthquakes among others. This info may be useful for rescue teams and mission members. However, such information may be not accurate and exaggerated. Thus, rescue teams and mission members may not rely their decisions on this type of information.

Currently, filtering and validation software may be applied to data feeds; this may reduce "noise" and may validate information. However, current systems and methods do not provide seamless processing and live display of information. In addition, information has to be organized and summarized in order to be suitable for first responders, mission members or anyone needing real-time situational awareness. This may consume time that is required for mission planning and response.

Thus there is a need for a system and method capable of performing detection, extraction and validation of events found in one or more data sources, and effectively associate the extracted events with independent entities. Such a system or method may be able to seamlessly summarize and prioritize events based on the information received and may also provide live information displays of information.

SUMMARY

A system and method for detecting events based on input data from a plurality of sources such as, social media, news feeds and/or a corpus of documents. The system may receive input from a plurality of sources through a plurality of ingestion modules, each of one may be optimized for a specific source. Ingestion modules may base their scanning or collecting of data streams on keywords, metadata, tags, relevant information attached (for pictures and videos), geographic location and time. Ingestion modules may provide live data streams to a cloud system, which may process such information filtering and summarizing such information in a seamless operation. The system may allow for the detection of events happening, and their proper association to disambiguated entities through text analysis of different sources.

Processed data may be validated/verified and subsequently stored and distributed among any device able to establish a link with the cloud. Devices may be used by first responders and mission planners. Devices may include cell phones, tablets, laptops and the like. In addition, such devices may include an application or software that may display data processed live and seamless. Furthermore, devices may provide feedback to cloud in order to obtain more data streams from event. Such data may be processed as a new data ingestion. In addition, devices may be able to obtain processed data from a plurality of data stores, which may include web-servers, local storage among others. This feature ensures availability and reliability of the information.

In one embodiment, a computer-implemented method comprises receiving, by a computer, from a plurality of data sources a plurality of data streams containing one or more events, wherein each respective data source comprises a server publishing a corresponding data stream; responsive to identifying, by the computer, one or more ingestion modules corresponding respectively to a set of one or more data streams of the plurality of data streams: determining, by the computer, whether each respective data stream in the set satisfies a set of one or more common criteria based on comparing against one or more data files containing data of one or more types stored in a database, wherein at least one data file is an event template modeling an event; and responsive to identifying, by the computer, a second set of one or more data streams not corresponding to the one or more ingestion modules: determining, by the computer, whether each respective data stream in the second set satisfies a second set one or more common criteria based on comparing each respective data stream in the second set against one or more data files containing data of one or more types stored in the database, wherein at least one data file is a second event template modeling a second event; and storing, by the computer, each respective data stream of the second set as a new event responsive to determining the respective data stream satisfies the second set of criteria.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures

DEFINITIONS

Figure 1:
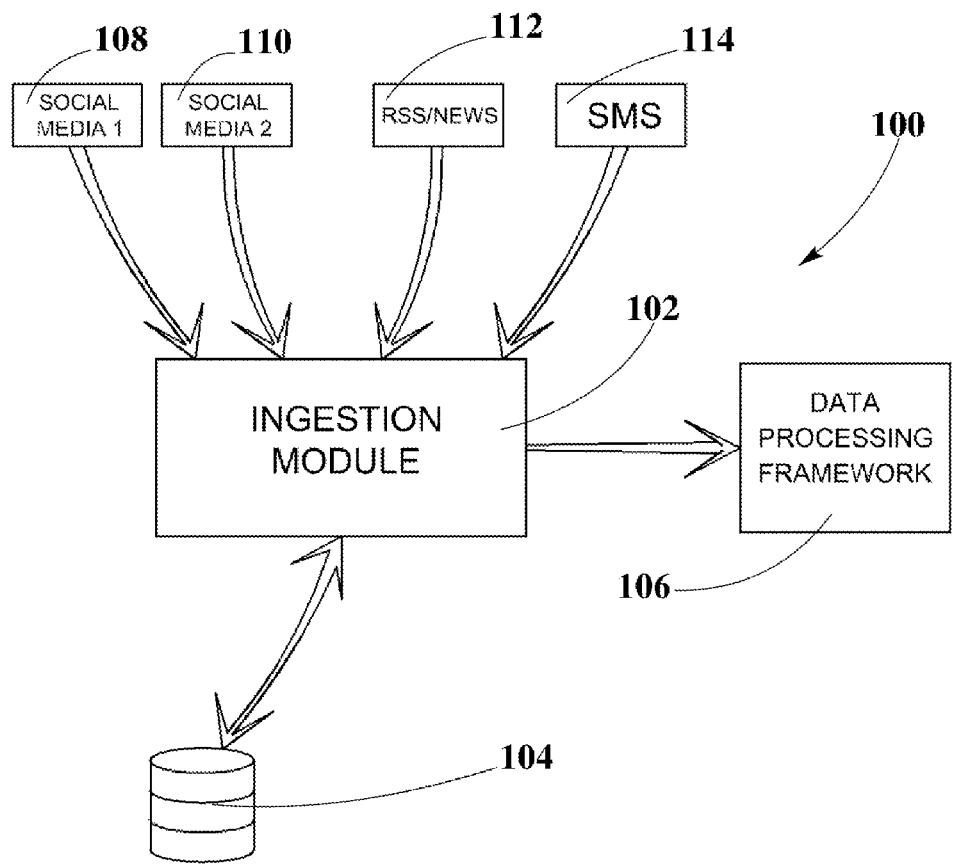
FIG. 1 is a block diagram illustrating a data streams extraction from a plurality of sources by an ingestion module.

As used here, the following terms may have the following definitions:

Entity extraction" refers to information processing methods for extracting information such as names, places, and organizations.

"Data" refers to information containing text, images, videos, geographic locations among others.

"Data Stream" refers to an individual bundle of data from a particular source or a continuous feed of information from a particular source.

"Noise" refers to a plurality of not relevant, not related and useless data, which may be attached to data streams.

"Features" is any information which is at least partially derived from a document.

"Event Concept Store" refers to a database of Event template models.

"Event" refers to one or more features characterized by at least its occurrence in time.

"Module" refers to a computer or software components suitable for carrying out at least one or more tasks.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Various embodiments of the systems and methods disclosed here collect data from different sources in order to identify independent events using systems and methods to train customized and data source-specific event templates, and event models for different input data streams originating from various data sources, which may yield possibly high accuracy event detection. Ingestion modules executed by various nodes of an exemplary system may be customized for each type of data source, in an automated or manual fashion. Systems and methods may provide an event-based communication system, which may enable embodiments to gather and communicate event-related information between "ingestion modules," which may then perform verification and validation of events detected by ingestion modules, by comparing detections of the same events (in parallel) at each of the other ingestion modules. Comparison of event detection results may be facilitated by embodiments implementing an event data normalization technique, which may produce a common event definition template (i.e., description schema) thus providing compatible data fields for comparing an event detected from different data sources by different ingestion modules of the system.

Data Streams Extraction

FIG. 1 is a block diagram depicting an exemplary embodiment of data streams extraction 100, which may include an ingestion module 102 for extracting data streams from a plurality of sources. Such sources may include social media, news sources, and/or any other sources that contain information related to events.

Ingestion module 102 may collect, scan or receive data streams from a specific and single source such as a social media web page (e.g., Facebook® or Twitter®), news page, and online forums, among others. Furthermore, ingestion module 102 may be fed by a variety of sources, which may include a combination of web pages, social media, Short Message Service ("SMS"), Really Simple Syndication or Rich Site Summary ("RSS") feeds, and similar networked electronic messaging services and protocols. Such sources may be Facebook® 108, Twitter® 110, an RSS feed from a news source 112, and SMS feeds 114.

Ingestion module 102 may include one or more algorithms, one or more sets of instructions, one or more search protocols, and one or more search engines, for collecting data streams from a plurality of sources.

Ingestion modules 102 may have access to one or more of databases 104 containing templates, models, search paths, definitions, instructions among others. Thus, ingestion module 102 may perform data pre-processing by comparing data streams with the stored templates; this may reduce noise and redundancy of data streams.

Templates may define an event (e.g., kidnapping) in terms of semantic roles for the entities involved (e.g., perpetrator, victim, date time). Such databases 104 may be able to facilitate automated learning by ingestion module 102. Thus, new information and corrections may be automatically updated in a database 104. This automated training and correcting may be performed as a semi-supervised process, a supervised process, and/or an unsupervised process. The training process may allow human users to manually update templates, and event models, among others, as well as to check system when required.

In the case of receiving data streams from a specific source, ingestion module 102 may be optimized in order to obtain data streams with high speed and quality. Thus, algorithms, search engines and databases 104 may be specifically focused to the data streams produced from the specific source. Templates and search engines may possess predefined specific search criteria.

Ingestion module 102 may take keywords and/or metadata from data streams and then may compare them against models and/or templates in databases 104. Ingestion module 102 may determine if a set of keywords and/or metadata pertains to a certain event by comparing them against all event models and/or templates in each database 104. After comparison, ingestion module 102 may deliver data streams to data processing module 106, which may perform data processing framework.

Database Learning Process

Figure 2:
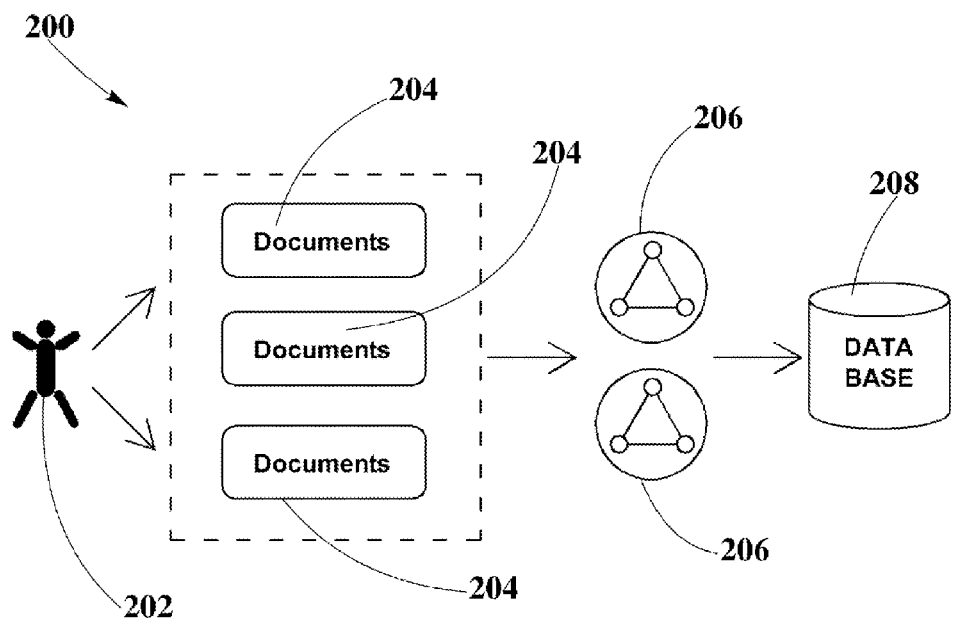
FIG. 2 is block diagram illustrating manual training process for database used by an ingestion module.

FIG. 2 depicts training process 200 to build a database 208. A plurality of documents 204 may be manually tagged by a person 202 in order to identify features pertaining to specific events and assign weights to those features. In this example, the features are keywords. In some embodiments the features may be images, sounds, or other identifying characteristics for determining an event.

For example, an event model 206 may be "explosion"; a person can manually identify in a document 204 relating to an explosion the co-occurrence of keywords such as "bomb" and/or "fire". The user may then assign a weighted value to each keyword, depending on the repetition or the co-occurrence of these keywords with others in a plurality of documents 204 related to explosions, and associate those with an event model 206 for "explosion" stored in database 208.

Figure 3:
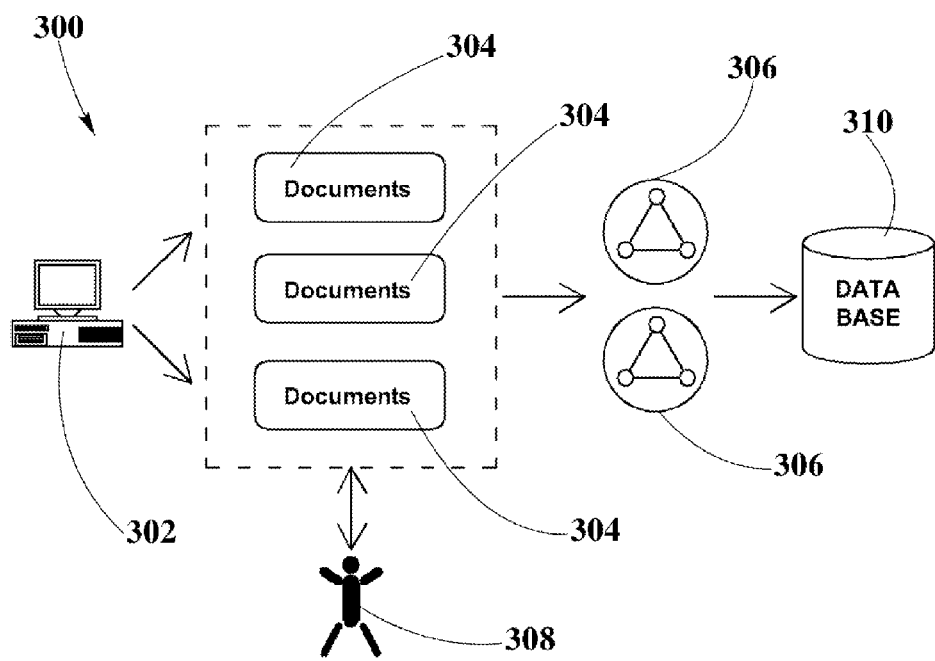
FIG. 3 is block diagram illustrating automatic training process for database used by an ingestion module.

FIG. 3 depicts training process 300 to build a database 310. A plurality of documents 304 may be automatically tagged by a computer software 302, algorithm and/or set of instructions at ingestion module 102.

Training process 300 may be performed in order to identify features, which in this example are keywords, pertaining to specific events and assign weighted values to those keywords.

In some embodiments, a person 308 may semi-supervise training process 300 by evaluating and correcting information tagged and assigned to specific events, this may add an extra layer of data reliability.

In addition to the automatic training process 300, person 308 may, in some embodiments, be able to manually tag other keywords in order to identify keywords pertaining to specific events and assign weights to those keywords.

For example, an event model 306 may be associated with the event "explosion"; computer software 302 can automatically identify in a document 304 relating to an explosion the co-occurrence of keywords such as "bomb" and/or "fire". Computer software 302 may then assign a weight to each word depending on the repetition or the co-occurrence of these keywords with others in a plurality of documents 304 related to explosions, and associate those with an event model 306 for explosion stored in database 310.

Ingestion Module Operation

Figure 4:
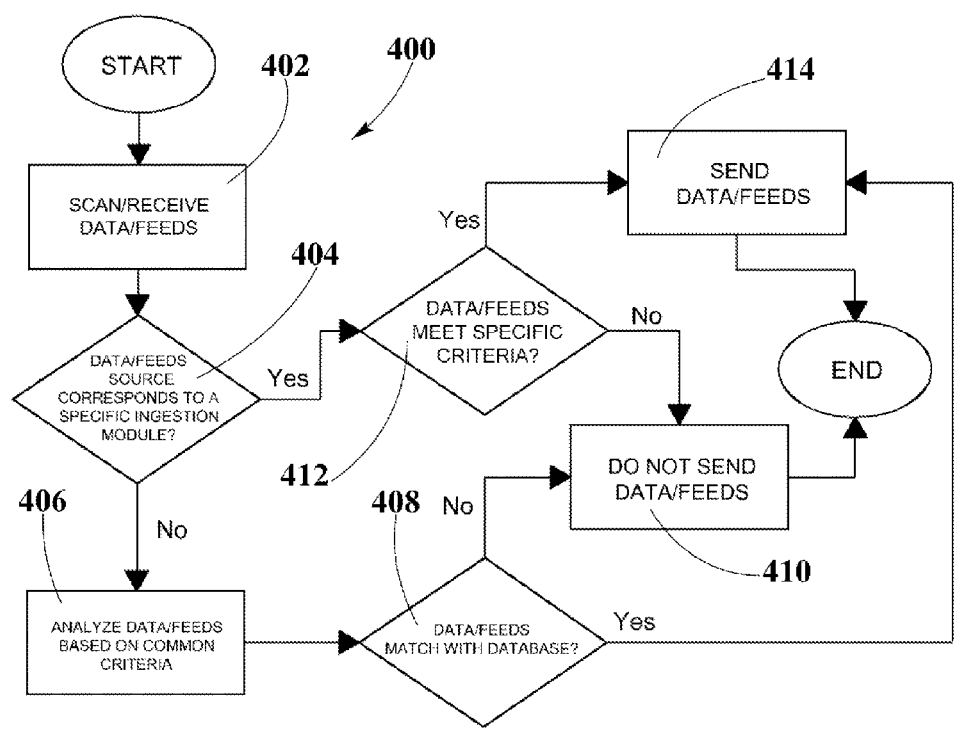
FIG. 4 is a flowchart illustrating workflow of ingestion module operation.

FIG. 4 is a flowchart depicting ingestion module operation 400, which may start at scan/receive data streams step 402, when one or more ingestion modules 102 receive or scan for data streams from a plurality of sources.

Scanning may be performed through active reading of publication in data stream sources; such sources may include social media web pages (e.g., Facebook®, Twitter®), blogs, and the like. Moreover, ingestion modules 102 may receive data streams from a plurality of data stream sources. This may be allowed through subscriptions, RSS delivery, SMS, e-mails, and the like. Ingestion modules 102 may be able to perform these two methods (scanning and receiving) at the same time and independently.

Subsequently, in a step for determining whether a data stream source corresponds to a specific ingestion module, in check 404, data streams scanned and received may be sent to a generic ingestion module 102 which may collect data streams from a plurality of sources, or data streams scanned and received may be sent to an optimized ingestion module 102.

An optimized ingestion module 102 may be customized for specific data stream sources, such as Facebook® or Twitter®, among others. A specific data stream source may be a single source or a group of sources gathered by common topic, type of data received (e.g., text, images, videos), and/or format of publication (e.g., limitation of characters), this may include groups of forums or blogs about an specific topic, news pages, and the like.

If data streams do not correspond to a specific ingestion module 102, then at analyze data streams based on common criteria step 406, ingestion module 102 may authorize scanned/received data streams to be analyzed through common criteria set for any data stream source.

The common criteria analysis may be performed at "data streams match with database" check 408, by a comparison between templates, models, search paths, definitions, and/or instructions, among others, which may be previously stored in a database 104. By comparing data streams with the stored templates, models, search paths, and the like, ingestion module 102 may perform data streams pre-processing by comparing, which may reduce noise and redundancy of data streams.

Templates may define an event (e.g. kidnapping) in terms of semantic roles for the entities involved (e.g. perpetrator, victim, date time). Templates may take keywords and/or metadata from data streams and may establish a comparison with the database 104 template. For example, if a group of keywords such as, "building," "ground moving," "earthquake," and "walls cracked" are scanned/received, then ingestion module 102 may compare such terms with the templates in database 104, templates may be indexed by event, in this case, the event may be labeled as "earthquake".

Thus, by applying check 408 means that ingestion module 102 may avoid delivering data streams that are redundant or not related with the event or topic (noise) at "do not send data streams" step 410, and the ingestion module operation 400 may end.

If data streams match with templates in database 104, then ingestion module 102 may send data streams 414 to data processing modules, data storages, and the like. Subsequently, ingestion module operation 400 may end.

If, in check 404, data streams correspond to a specific ingestion module 102, then at "data streams meet specific criteria" check 412, ingestion module 102 optimized for a specific data/source may perform an analysis to scanned/received data streams, which may be based on specific criteria set for the data streams source, such criteria may include type of vocabulary used, data format, limitation of characters, frequency of new data streams released and the like.

An optimized ingestion module 102 may perform comparison between scanned/received data streams with the templates, models, and search paths, among others, that are stored in database 104. Because there are specific criteria for the optimized ingestion module 102, specific templates, models, and search paths, among others, may be employed in database 104 too.

By comparing data streams with the stored specific templates, models, search paths, and the like, ingestion module 102 may perform data streams pre-processing by comparing, which may reduce noise and redundancy of data streams.

Templates may define an event (e.g. kidnapping) in terms of semantic roles for the entities involved (e.g. perpetrator, victim, date time). Templates may take keywords and/or metadata from data streams and may establish a comparison with the database 104 template.

For example, if a group of keywords such as, "building," "ground moving," "earthquake," and "walls cracked," are scanned/received from and a specific source, such as an RSS news feed, then optimized ingestion module 102 may compare such terms with the templates in database 104, then templates may be indexed by event, in this case, the event may be labeled as "earthquake".

Thus, ingestion module 102 may avoid collecting data streams that are redundant or not related (noise) at "do not send data streams" step 410, and the ingestion module operation 400 may end.

If data streams match with templates in database 104, then ingestion module 102 may send data streams 414 to data processing modules, data storages and the like. Subsequently, ingestion module operation 400 may end.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   receiving, by a computer, from a plurality of data sources, a plurality of raw data streams containing one or more events, wherein each respective data source comprises a server publishing a corresponding raw data stream;
   pre-processing, by the computer, the plurality of raw data streams for subsequent processing, wherein pre-processing the plurality of raw data streams comprises:
   responsive to identifying, by the computer, one or more ingestion modules corresponding respectively to a set of one or more raw data streams of the plurality of raw data streams:
   determining, by the computer, whether each respective raw data stream in the set satisfies a set of one or more specific criteria based on comparing each respective raw data stream in the set against one or more data files containing data of one or more types stored in a database, wherein at least one criterion of the one or more specific criteria is selected from the group consisting of: type of vocabulary used, data format, limitation of characters, and frequency of new data streams released, and wherein at least one data file of the one or more data files is an event template modeling an event; and responsive to identifying, by the computer, a second set of one or more raw data streams not corresponding to the one or more ingestion modules:

determining, by the computer, whether each respective raw data stream in the second set satisfies a set one or more common criteria based on comparing each respective raw data stream in the second set against one or more data files containing data of one or more types stored in the database, wherein the comparison is based on at least one type of data selected from the group consisting of: templates, models, search paths, and definitions, and wherein at least one data file of the one or more data files is a second event template modeling a second event;

processing, by the computer, each respective raw data stream of the second set as indicating a new event responsive to determining that the respective raw data stream satisfies the common set of criteria;

determining, by the computer, whether one or more features in each respective data stream indicated as the new event satisfy one or more event models in a categorization table, based upon the computer comparing the one or more features of each respective data stream as the new event against the one or more event models; and responsive to the computer determining that the one or more features from each respective data stream indicated as the new event fail to satisfy at least one event model in at least one categorization table:

comparing, by the computer, the one or more features from each respective data stream indicated as the new event against one or more uncategorized event models in an uncategorized event table, wherein the uncategorized event table store records associated with new unknown event models; and storing, by the computer, the one or more features from each respective data stream indicated as the new event as a new uncategorized event model in the uncategorized event table, in response to determining the one or more features from each respective data stream indicated as the new event fail to satisfy at least one uncategorized event model.

2. The method according to claim 1, wherein the plurality of data sources comprises social media websites, online news websites, and blogs.

3. The method according to claim 1, wherein the templates define an event in terms of semantic roles of one or more entities.

4. The method according to claim 1, wherein the one or more ingestion modules comprises at least an optimized ingestion module configured to receive a raw data stream from a pre-defined list of data sources, and wherein the pre-defined list of data sources are selected by a common topic, type of data received, and format of publication.

5. The method according to claim 1, wherein the pre-processing reduces noise and redundancy of the plurality of raw data streams.

6. The method according to claim 1, further comprising transmitting, by the computer, the set of one or more raw data streams to a data processing module responsive to identifying the set of one or more raw data streams corresponding to the one or more ingestion modules.

7. The method according to claim 1, further comprising selecting, by the computer, one or more words in the plurality of raw data streams pertaining to the one or more events.

8. The method according to claim 7, further comprising assigning, by the computer, a weight to each of the one or more words.

9. The method according to claim 8, wherein the weight is assigned to each of the one or more words based on co-occurrence of each of these words with respect to the other words of the one or more words in the plurality of data streams.

10. The method according to claim 9, further comprising evaluating, by the computer, the weight assigned to each of the one or more words based on change in the co-occurrence number of each of these words with respect to the other words of the one or more words in the plurality of data streams.

* * * * *